US011785593B2

(12) United States Patent
Li et al.

(10) Patent No.: US 11,785,593 B2
(45) Date of Patent: Oct. 10, 2023

(54) SPECIFIC SCHEDULING REQUEST

(71) Applicant: Apple Inc., Cupertino, CA (US)

(72) Inventors: Guoqing Li, Campbell, CA (US);
Brajesh K. Dave, Fremont, CA (US);
Shehla S. Rana, San Jose, CA (US);
Yang Yu, Redwood City, CA (US);
Rajneesh Kumar, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/032,292

(22) Filed: Sep. 25, 2020

(65) Prior Publication Data

US 2021/0100015 A1    Apr. 1, 2021

Related U.S. Application Data

(60) Provisional application No. 62/906,928, filed on Sep. 27, 2019.

(51) Int. Cl.
*H04W 72/1268* (2023.01)
*H04W 84/12* (2009.01)
*H04L 69/22* (2022.01)
*H04W 28/24* (2009.01)

(52) U.S. Cl.
CPC ......... *H04W 72/1268* (2013.01); *H04L 69/22* (2013.01); *H04W 28/24* (2013.01); *H04W 84/12* (2013.01)

(58) Field of Classification Search
CPC . H04W 72/1268; H04W 28/24; H04W 84/12; H04W 72/1284; H04L 69/22
See application file for complete search history.

(56) References Cited

U.S. PATENT DOCUMENTS

| 8,305,893 | B2 | 11/2012 | Verma et al. | |
|---|---|---|---|---|
| 9,591,679 | B2 | 3/2017 | Bontu et al. | |
| 9,713,087 | B2 | 7/2017 | Asterjadhi et al. | |
| 10,070,458 | B2 | 9/2018 | Ferdowsi et al. | |
| 2006/0159105 | A1* | 7/2006 | Kleo ................. | H04W 72/0453 370/352 |
| 2007/0053322 | A1* | 3/2007 | Park ................. | H04W 72/1257 370/329 |
| 2009/0279511 | A1* | 11/2009 | Zhu ................... | H04W 72/1215 370/336 |
| 2010/0226343 | A1* | 9/2010 | Hsu ....................... | H04W 74/02 370/336 |
| 2016/0219522 | A1* | 7/2016 | Asterjadhi ........ | H04W 28/0221 |
| 2017/0164371 | A1* | 6/2017 | Kim ................. | H04W 74/0816 |

FOREIGN PATENT DOCUMENTS

| WO | WO-2004004194 A2 * | 1/2004 | ........... H04L 1/0007 |
|---|---|---|---|
| WO | WO-2005015413 A1 * | 2/2005 | ......... H04L 47/2408 |

\* cited by examiner

*Primary Examiner* — Mohammad S Anwar
(74) *Attorney, Agent, or Firm* — Kowert, Hood, Munyon, Rankin & Goetzel, P.C.

(57) ABSTRACT

Methods, systems, and apparatus are presented for providing enhanced scheduling requests, e.g., in an IEEE 802.11 network. A client station (STA) may determine one or more minimum quality of service (QoS) metrics for supporting an application being implemented by the STA, and may determine minimum scheduling parameters to be implemented by an access point (AP) to achieve the minimum QoS. The STA may transmit to the AP a specific scheduling request indicating the minimum scheduling parameters. In response, the AP may schedule communication resources for the STA in accordance with the minimum scheduling resources.

20 Claims, 5 Drawing Sheets

SPECIFIC SCHEDULING REQUEST

PRIORITY CLAIM

This application claims benefit of priority of U.S. provisional application Ser. No. 62/906,928, titled "Specific Scheduling Request", filed Sep. 27, 2019, which is hereby incorporated by reference in its entirety as though fully and completely set forth herein.

TECHNICAL FIELD

The present application relates to wireless communication, including to techniques for performing network resource scheduling.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices, or user equipment devices (UEs) may take the form of smart phones or tablets that access wireless local area networks (WLANs). In many environments, a large number of WLAN access points may be available, and it may be a time and energy intensive process for a UE to determine the most desirable wireless access point upon which to connect. Therefore, improvements in the field are desired.

SUMMARY

Embodiments are presented herein of, inter alia, systems, apparatuses, and methods for performing network resource scheduling.

A client station (STA) may determine one or more minimum quality of service (QoS) metrics for communication between the STA and an access point (AP), such as one or more minimum QoS metrics for supporting an application being implemented by the STA, and may determine minimum scheduling parameters to be implemented by the AP to achieve the minimum QoS. The STA may transmit to the AP a specific scheduling request indicating the minimum scheduling parameters. In response, the AP may schedule communication resources for the STA in accordance with the minimum scheduling resources. The STA may receive a resource allocation message from the AP, allocating the communication resources to the STA, based at least in part on the specific scheduling request. The STA may then communicate with the AP using the allocated communication resources.

In some scenarios, the specific scheduling request may be included in an A-Control field of a MAC header of a communication packet. In some such scenarios, the MAC header may further include an indication that the A-Control field includes the specific scheduling request.

In some scenarios, the specific scheduling request may be included in an information element of a management frame.

In some scenarios, the specific scheduling request may be transmitted in response to initiation of the application.

In some scenarios, the minimum scheduling parameters may include a minimum interval and/or a maximum interval between trigger frames transmitted by the AP, wherein the trigger frames carry resource allocation information for the STA. In some scenarios, the minimum scheduling parameters may include a minimum data throughput to be accommodated by the allocated communication resources.

In some scenarios, the specific scheduling request may further indicate feedback regarding current allocation of communication resources to the STA. For example, the feedback regarding current allocation of communication resources to the STA may include a request that the AP transmit trigger frames more frequently than currently scheduled. As another example, the feedback may include a request that the AP allocate more resource units to the STA than are currently allocated, As another example, the feedback may include a request that the AP set up a block-acknowledge agreement with the STA.

Apparatuses and systems are disclosed for implementing methods such as those summarized above.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
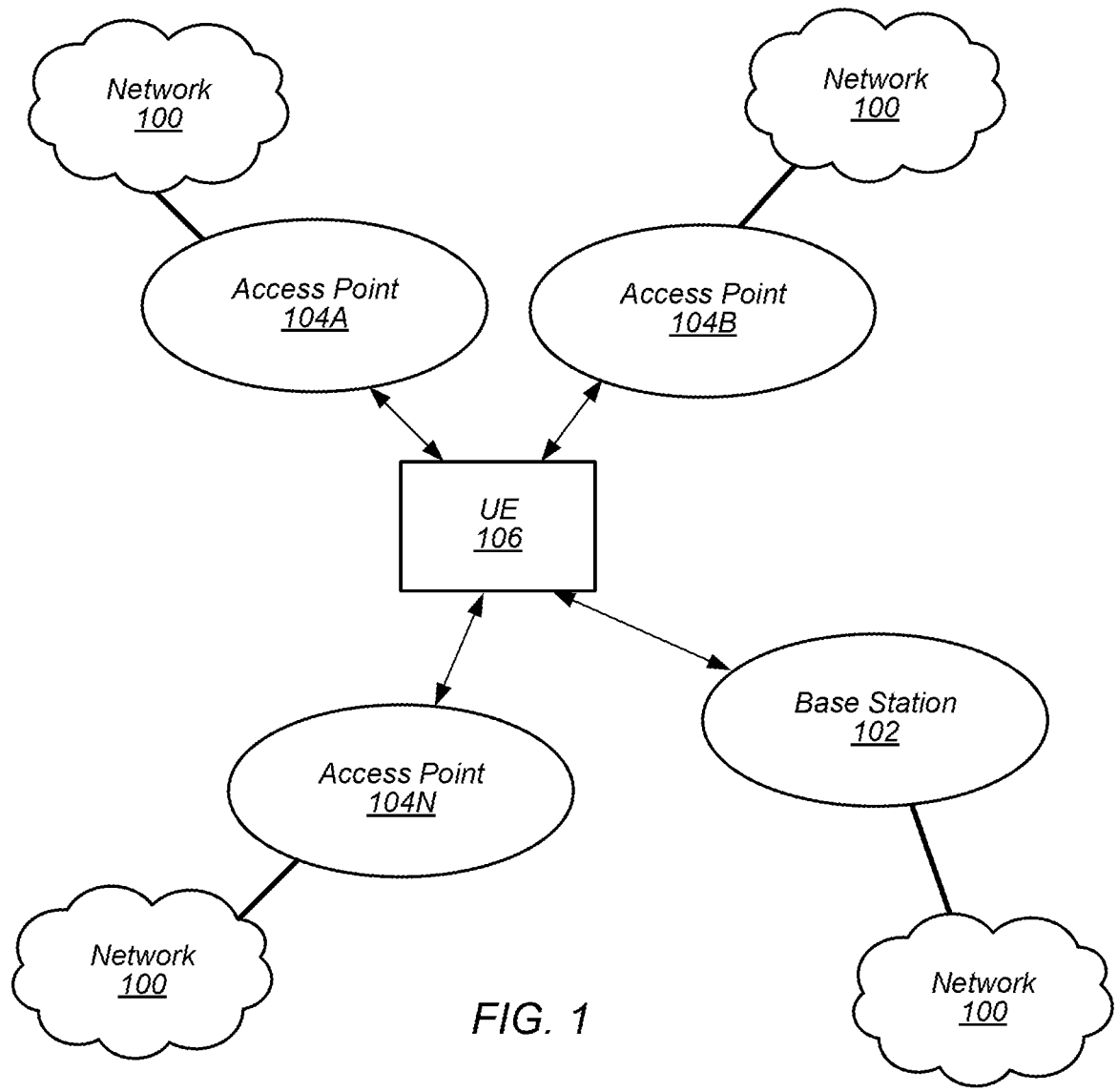
FIG. 1 illustrates an example wireless communication system including a user equipment device (UE), according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Incorporation by Reference

The following documents are hereby incorporated by reference, as though fully set forth herein:

IEEE 802.11-2016

IEEE 802.11ax D4.3

Acronyms

The following acronyms are used in this disclosure.
AP: Access Point
BSR: Buffer Status Report
IE: Information Element
MAC: Medium Access Control
OUI: Organizationally Unique Identifier
PLCP: Physical Layer Convergence Protocol
QoS: Quality of Service
SSR: Specific Scheduling Request
SU EDCA: Single User Enhanced Distributed Channel Access
STA: Station (e.g., a wireless communication station)
TB PPDU: Trigger-Based PLCP Protocol Data Unit
TID: Traffic Identifier
UE: User Equipment
UMTS: Universal Mobile Telecommunications System
WLAN: Wireless Local Area Network

Terminology

The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB" or "gNB") has the full breadth of its ordinary meaning, and at least includes a wireless communication station installed at a fixed location and used to communicate as part of a wireless cellular communication system.

Link Budget Limited—includes the full breadth of its ordinary meaning, and at least includes a characteristic of a wireless device (a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

FIG. 1—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device. The wireless embodiment described below is one example embodiment.

As shown, the exemplary wireless communication system includes a plurality of wireless access points (APs) 104A-104N, which communicate over a wireless local area network (WLAN) with a wireless device 106. The wireless device 106 may be a user device, which may be referred to herein as "user equipment" (UE), or a UE device.

Note that at least in some instances a UE device 106 may be capable of communicating using any of a plurality of wireless communication technologies. For example, a UE device 106 might be configured to communicate using one or more of GSM, UMTS, CDMA2000, LTE, LTE-A, 5G NR, WLAN (including Wi-Fi or IEEE 802.11-compliant protocols), Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106 may be configured to communicate using only a single wireless communication technology.

As shown, the exemplary wireless communication system also includes a plurality of WLAN APs 104A-N, which communicate over a transmission medium with the wireless device 106. The WLAN AP, which may be a Wi-Fi AP, also provides communicative connectivity to the network 100. Each of the WLAN APs (which may be more concisely referred to herein as "APs") may communicate within one or more different WLAN frequency bands, such as 2.4 GHz, 5 GHz, and/or 6 GHz, among other possibilities. Thus, according to some embodiments, wireless devices may be able to connect to one or more of the access points 104A-N and/or the base station 102 (or another cellular base station) to access the network 100 at a given time.

The UE 106 may include a handheld device such as a smart phone or tablet, and/or may include any of various types of device with cellular communications capability. For example, the UE 106 may be a wireless device intended for stationary or nomadic deployment such as an appliance, measurement device, control device, etc.

The UE 106 may include a device or integrated circuit for facilitating cellular communication, referred to as a cellular modem. The cellular modem may include one or more processors (processor elements) and various hardware components as described herein. The UE 106 may perform any of the method embodiments described herein by executing instructions on one or more programmable processors. Alternatively, or in addition, the one or more processors may be one or more programmable hardware elements such as an FPGA (field-programmable gate array), or other circuitry, that is configured to perform any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UE 106 may include one or more antennas for communicating using two or more wireless communication protocols or radio access technologies. In some embodiments, the UE device 106 might be configured to communicate using a single shared radio. The shared radio may couple to a single antenna, or may couple to multiple antennas (e.g., for MIMO) for performing wireless communications. Alternatively, the UE device 106 may include two or more radios. Other configurations are also possible.

The UE 106 may be further configured to wirelessly communicate with a cellular base station 102, which may also be equipped to communicate with the network 100 (e.g., a core network of a cellular service provider, a telecommunication network such as a public switched telephone network (PSTN), and/or the Internet, among various possibilities). Thus, the base station 102 may facilitate communication among the UE devices 106 and/or between the UE devices 106 and the network 100. In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106 may be configured to communicate over the transmission medium using any of various radio access technologies (RATs) or wireless communication technologies, such as GSM, UMTS (WCDMA, TDS-CDMA), LTE, LTE-Advanced (LTE-A), 5G NR, HSPA, 3GPP2 CDMA2000 (e.g., 1xRTT, 1xEV-DO, HRPD, eHRPD), Wi-Fi, WiMAX etc.

Base station 102 and other similar base stations (not shown) operating according to one or more cellular communication technologies may thus be provided as a network of cells, which may provide continuous or nearly continuous overlapping service to the UE device 106 and similar devices over a geographic area via one or more cellular communication technologies.

The UE 106 and/or one or more of the APs 104 may be configured to perform any of the methods disclosed herein, e.g., to perform network probing.

Figure 2:
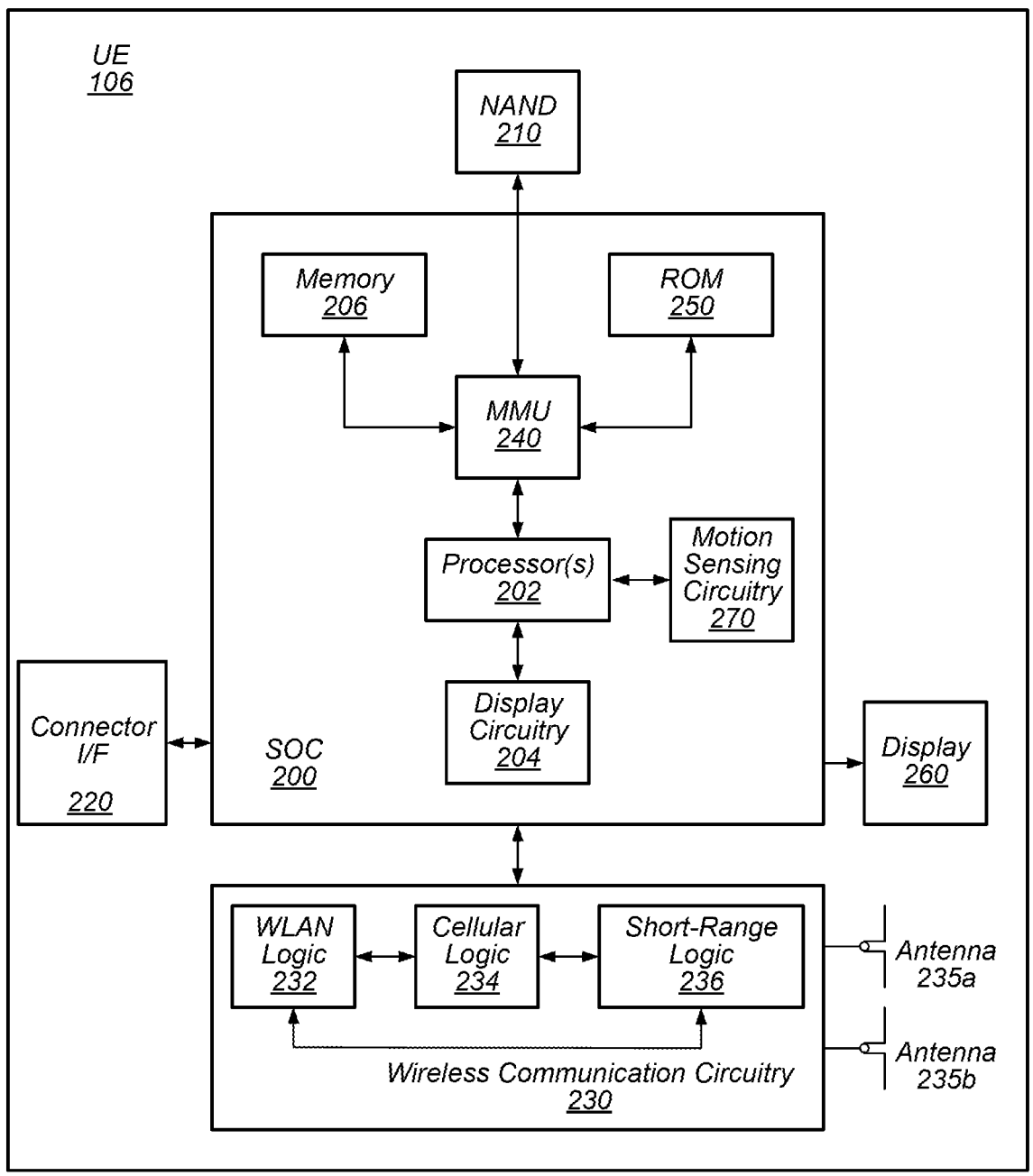
FIG. 2 is a block diagram illustrating an example UE, according to some embodiments.

FIG. 2—Example Block Diagram of a UE Device

FIG. 2 illustrates one possible block diagram of a UE device, such as UE device 106. As shown, the UE device 106 may include a system on chip (SOC) 200, which may include portions for various purposes. For example, as shown, the SOC 200 may include processor(s) 202 which may execute program instructions for the UE device 106, and display circuitry 204 which may perform graphics processing and provide display signals to the display 260. The SOC 200 may also include motion sensing circuitry 270 which may detect motion of the UE 106, for example using a gyroscope, accelerometer, and/or any of various other motion sensing components. The processor(s) 202 may also be coupled to memory management unit (MMU) 240, which may be configured to receive addresses from the processor(s) 202 and translate those addresses to locations in memory (e.g., memory 206, read only memory (ROM) 250, flash memory 210). The MMU 240 may be configured to perform memory protection and page table translation or set up. In some embodiments, the MMU 240 may be included as a portion of the processor(s) 202.

As shown, the SOC 200 may be coupled to various other circuits of the UE 106. For example, the UE 106 may include various types of memory (e.g., including NAND flash 210), a connector interface (I/F) 220 (e.g., for coupling to a computer system, dock, charging station, etc.), the display 260, and wireless communication circuitry 230 (e.g., for LTE, LTE-A, NR, CDMA2000, Bluetooth, Wi-Fi, NFC, GPS, etc.).

The UE device 106 may include at least one antenna, and in some embodiments, multiple antennas 235a and 235b, for performing wireless communication with base station 102, wireless access points 104, and/or other devices. For example, the UE device 106 may use antennas 235a and 235b to perform the wireless communication. In some implementations, the antenna 235a and/or the antenna 235b may include a plurality of antennas and/or one or more antenna arrays. As noted above, the UE device 106 may in some embodiments be configured to communicate wirelessly using a plurality of wireless communication standards or radio access technologies (RATs). When the UE 106 is in communication with a wireless access point 104 over a WLAN network, the UE 106 may be referred to as a wireless station, or "STA".

The wireless communication circuitry 230 may include WLAN Logic 232, Cellular logic 234, and/or Short-range Logic 236. The WLAN Logic 232 is for enabling the UE device 106 to perform Wi-Fi and/or other WLAN communications on a wireless network, such as an 802.11 network. The Short-range Logic 236 is for enabling the UE device 106 to perform wireless communications according to any of various short-range communication protocols, such as Bluetooth (BT), Bluetooth Low-Energy (BLE), near-field communication (NFC), ultra wideband (UWB), etc. The cellular logic 234 may be a cellular modem capable of performing cellular communication according to one or more cellular communication technologies, such as GSM, UMTS, LTE, LTE-A, 5G NR, HSPA, 3GPP2 CDMA2000, etc. In some scenarios, each of the WLAN Logic 232, the Cellular Logic 234, and the Short-range Logic 236, or some portion thereof, may be referred to as a radio. For example, the WLAN Logic 232 may be referred to as, or may include, a WLAN radio, such as a Wi-Fi radio; the Cellular Logic 234 may be referred to as, or may include, a cellular radio; and/or the Short-range Logic 336 may be referred to as, or may include, one or more of a BT radio, a NFC radio, a UWB radio, etc.

As described herein, UE 106 may include hardware and software components for implementing embodiments of this disclosure, e.g., to perform resource scheduling via specific scheduling requests, according to any of the methods disclosed herein. For example, one or more components of the wireless communication circuitry 230 (e.g., WLAN Logic 232, cellular logic 234, Short-range Logic 236) of the UE device 106 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 3:
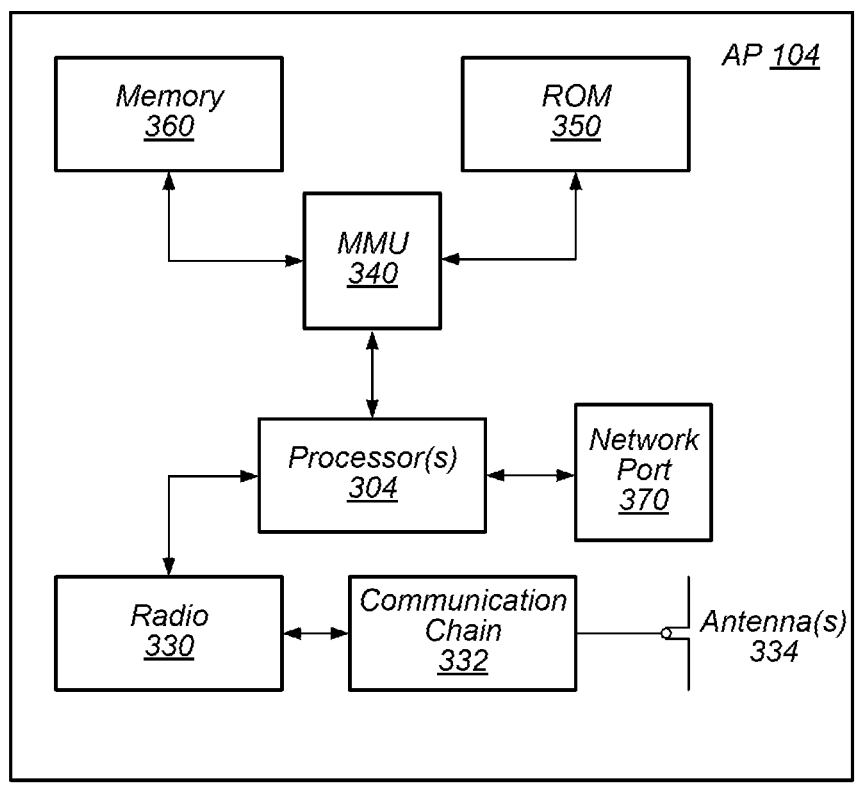
FIG. 3 is a block diagram illustrating an example wireless access point, according to some embodiments.

FIG. 3—Block Diagram of a WLAN Access Point

FIG. 3 illustrates an example block diagram of a WLAN access point (AP) 104, according to some embodiments. It is noted that the AP of FIG. 3 is merely one example of a possible AP. As shown, the AP 104 may include processor(s) 304 which may execute program instructions for the access point 104. The processor(s) 304 may also be coupled to memory management unit (MMU) 340, which may be configured to receive addresses from the processor(s) 304 and translate those addresses to locations in memory (e.g., memory 360 and read only memory (ROM) 350) or to other circuits or devices.

The AP 104 may include at least one network port 370. The network port 370 may be configured to couple to a telephone network and provide a plurality of devices, such as UE devices 106, access to the telephone network as described above in FIG. 1.

The network port 370 (or an additional network port) may also or alternatively be configured to couple to a cellular network, e.g., a core network of a cellular service provider. The core network may provide mobility related services and/or other services to a plurality of devices, such as UE devices 106. In some cases, the network port 370 may couple to a telephone network via the core network, and/or the core network may provide a telephone network (e.g., among other UE devices serviced by the cellular service provider).

The AP 104 may include at least one wireless transceiver, which may include one or more radio 330, one or more communication chain 332 and one or more antenna 334. The wireless transceiver and may be further configured to communicate with UE device 106. Communication chain 332 may be a receive chain, a transmit chain, or both, and may include, e.g., physical layer processing circuitry. The radio 330 may be configured to communicate via one or more of various wireless communication standards, including, but not limited to, LTE, LTE-A, NR, GSM, UMTS, CDMA2000, Wi-Fi, etc. Each of the antennas 334 may be configured to operate within a different frequency band, and/or within a separate WLAN network, in some embodiments.

The AP 104 may be configured to communicate wirelessly using multiple wireless communication standards. For example, as one possibility, the AP 104 may include an LTE or 5G NR radio for performing communication according to LTE or 5G NR, as well as a Wi-Fi radio for performing communication according to Wi-Fi. In such a case, the AP 104 may be capable of operating as both an LTE base station and a Wi-Fi access point. As another possibility, the AP 104 may include a multi-mode radio which is capable of performing communications according to any of multiple wireless communication technologies (e.g., NR and Wi-Fi, NR and UMTS, LTE and CDMA2000, UMTS and GSM, etc.). As still another possibility, the AP 104 may be configured to act exclusively as a Wi-Fi access point, e.g., without cellular communication capability.

As described further subsequently herein, the AP 104 may include hardware and software components for implementing or supporting implementation of features described herein, e.g., to perform resource scheduling via specific scheduling requests. The processor(s) 304 of the access point 104 may be configured to implement or support implementation of part or all of the methods described herein, e.g., by executing program instructions stored on a memory medium (e.g., a non-transitory computer-readable memory medium). Alternatively, the processor(s) 304 may be configured as a programmable hardware element, such as an FPGA (Field Programmable Gate Array), or as an ASIC (Application Specific Integrated Circuit), or a combination thereof. Alternatively (or in addition) the processor 304 of the AP 104, in conjunction with one or more of the other components 330, 332, 334, 340, 350, 360, and/or 370, may be configured to implement or support implementation of part or all of the features described herein.

Resource Scheduling via a Specific Scheduling Request

Legacy systems defined by the various IEEE 802.11 standards have defined contention-based operation. However, 802.11ax also defines downlink (DL) and uplink (UL) orthogonal frequency division multiple access (OFDMA) and UL multi-user (MU) multiple-input-multiple-output (MIMO) communications. These features enable Wi-Fi to function as a scheduling-based system. In a highly congested environment, a scheduling-based system tends to yield better performance than distributed contention-based operation.

However, UL OFDMA performance is highly dependent on the scheduling algorithms employed by the AP. For example, the AP, such as the AP 104, may determine when to trigger a STA (also referred to herein as a "client device"), such as the UE 106, and/or the number/size of resource units (RUs) assigned to the STA. STAs may have no control over these details. Therefore, the performance of a scheduling-based system may be improved by providing to the AP accurate and timely information about traffic to and/or from STAs with which the AP is communicating.

Providing information regarding DL traffic may be straightforward, because DL buffer information may be directly available to the AP. However, providing information regarding UL traffic may be more challenging, because the information must be provided by the STA.

The 802.11ax standard has defined two types of UL buffer status reports (BSRs) to allow the STA to report information regarding its UL traffic. Specifically, the first type of BSR may be included in the HE control field, whereas the second type of BSR may be included in the QoS control field. However, in some applications, neither type of BSR may include sufficient information to achieve a desired quality of service (QoS).

For example, according to the existing 802.11ax standard, a client can report only current transmit queue size (also referred to as buffer status) in BSR. Therefore, the AP remains unaware of future traffic, even if that traffic is known to the STA. Thus, the AP may not effectively allocate resources for such future traffic until after the traffic has entered the STA's transmit queue and been reported in a subsequent BSR. This may lead to the AP allocating resources too late, or allocating RU sizes that are too small, such that the STA's QoS requirements are not met.

As another example, channel access restrictions may result in long delays between BSRs sent by the STA. For example, under current restrictions governing MU enhanced distributed channel access (EDCA), a STA may experience a delay of up to 2 seconds before switching back to regular EDCA, if not triggered by the AP.

As a result of these shortcomings, a STA may not deliver a BSR to the AP in a timely manner. As a consequence, the AP's resource allocations may not satisfy the STA's QoS requirements, especially for latency-sensitive applications.

Additionally, resource allocation in response to a BSR may be somewhat unpredictable. For example, when a STA provides information regarding its current transmit queue size in a BSR, the AP may respond with an allocation that is not advantageous for the STA. For example, the AP may employ any of various options when allocating frequencies and/or RU sizes to the STA, and may not know which option is most appropriate for the STA. As a specific example, FIG. 4 illustrates two different possible resource allocations for a STA: allocation type 1 and allocation type 2.

Figure 4:
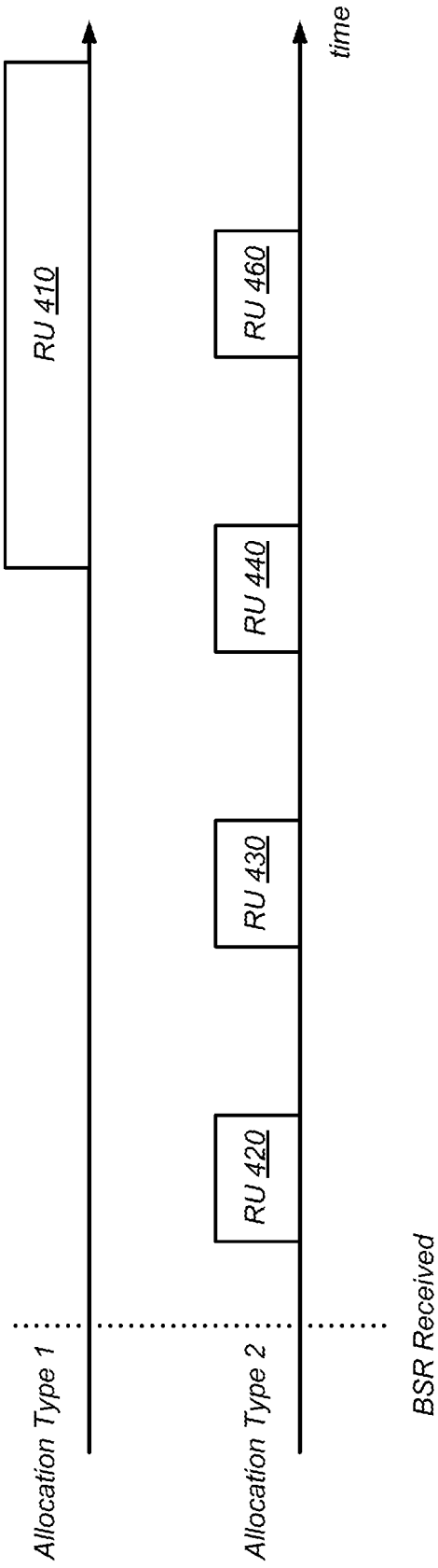
FIG. 4 illustrates two different possible resource allocations for a STA, according to some embodiments.

As illustrated in FIG. 4, in a first scenario, the AP may receive a BSR at a first time, and may respond by allocating a number of RUs to the STA in a single RU block 410 at some later time. With allocation type 1, the RU block 410 may be allocated with a duration and a number of RUs sufficient to deplete the STA's buffer as reported in the received BSR. However, allocation type 1 may lead to high latency, as well as buffer overflow risks, because the STA may not transmit for an extended time window prior to the occurrence of the RU block 410.

In a second scenario, the AP may receive the BSR at a first time, and may respond by allocating RUs to the STA in a plurality of RU blocks 420-460 at a plurality of later times. In various scenarios, the allocated RU blocks may have the same or different durations and/or numbers of RUs. With allocation type 2, the RU blocks 420-460 may be allocated with a cumulative duration and number of RUs sufficient to deplete the STA's buffer as reported in the received BSR. Allocation type 2 may alleviate the disadvantages noted previously with regard to allocation type 1, e.g., by allowing a more gradual flow of UL data from the STA's buffer. However, allocation type 2 may result in other disadvantages, such as loss of power-saving opportunities for the STA, and/or more complex scheduling with respect to other devices utilizing the channel.

Without additional information from the STA, the AP may use only the BSR information to determine the status of the STA for purposes of allocating RU blocks. In such scenarios, the AP it may select the option that would simplify the scheduler design (e.g., allocation type 1), to reduce the complexity of the allocation algorithm. However, this may not meet every STA's QoS requirements.

In addition, in some scenarios, the AP may not use (e.g., may ignore) the information received from the STA in the BSR. This makes allocation even harder to predict, which may render the STA unable to predict whether it will be able to meet the QoS requirements for a current application.

To address these shortcomings, a STA may provide to an AP a Specific Scheduling Request (SSR). The SSR may include scheduling request parameters and/or feedback regarding current scheduling. In some scenarios, the SSR may be transmitted periodically, or upon initiation or termination of a particular application. For example, in some scenarios, the SSR transmitted upon initiation of an application may include scheduling request parameters based on QoS requirements of that application and/or to accommodate expected traffic parameters for that application.

In some implementations, an SSR may be included in a medium access control (MAC) header, e.g., in an A-Control field. For example, the SSR may use a previously reserved value to communicate the scheduling request parameters and/or feedback regarding current scheduling. In some scenarios, the presence of the SSR within a first field, e.g., the A-Control field, may be signaled by a value included in a different field. As a specific example, the Control ID field may be set to a specific value (e.g., 14, which is currently a reserved value) to indicate that the A-Control field contains an SSR.

An example of one possible configuration of an SSR is shown in Table 1. The example shown in Table 1 may be included in the A-Control field of the MAC header, or may be included in a different field or different header. It should be understood that the SSR defined in Table 1 is a specific example, and numerous variations in format and/or arrangement of fields are also envisioned.

TABLE 1

|  | Min Trig Interval | Max Trig Interval | More Frequent Scheduling | More Allocations | DL BA Request | Slow LA Request | Reserved |
|---|---|---|---|---|---|---|---|
| Bits: | 10 | 10 | 1 | 1 | 1 | 1 | 2 |

The Min Trig Interval and Max Trig Interval fields may be used by the STA to request specific scheduling parameters to the AP, when available. Specifically, these fields may influence how often the AP transmits a trigger frame, which may carry resource allocation information to the STA.

The Min Trig Interval field specifies a requested minimum interval between trigger frames, e.g., in units of 5 ms. In some scenarios, a first specific value (e.g., 0) may be used to indicate that the STA does not request a minimum scheduling interval. In some scenarios, a second specific value (e.g., 1023) may be used to indicate that the previous Min Trig Interval is no longer valid.

The Max Trig Interval field specifies a requested maximum interval between trigger frames, e.g., in units of 5 ms. In some scenarios, a first specific value (e.g., 0) may be used to indicate that the STA does not request maximum scheduling interval. In some scenarios, a second specific value (e.g., 1023) may be used to indicate that the previous Max Trig Interval is no longer valid.

In some scenarios, additional or alternative fields may be used to signal/request other scheduling parameters to the AP. For example, the SSR may include a Min Allocation Rate field, specifying a requested minimum data throughput (e.g., at the MAC level) to be allocated. E.g., the STA may request that the AP allocate sufficient resources to allow the specified throughput.

The More Frequent Scheduling and More Allocations fields may be used by the STA to provide feedback regarding the quality of current scheduling parameters, when available.

The More Frequent Scheduling field may indicate a request that trigger frames be sent more frequently than currently scheduled. For example, in some scenarios, the More Frequent Scheduling field may be set to a first value (e.g., 1) to indicate that the STA requests the AP to send more frequent trigger frames to the STA. The More Frequent Scheduling field may be set to a second value (e.g., 0) to indicate that the STA does not request more frequent scheduling from the AP, e.g., because no information is available at the STA or because the current scheduling interval satisfies the STA's traffic requirement. In other scenarios, the More Frequent Scheduling field may include a plurality of bits, and may indicate additional information, such as a desired degree of increase in trigger frame frequency. Alternatively, the SSR may include one or more additional fields, such as a Step Size field associated with the More Frequent Scheduling field. Such a Step Size field may indicate a requested/suggested amount by which the AP should decrease the trigger frame interval in response to a request in the More Frequent Scheduling field.

The More Allocation field may indicate a request that a larger number of RUs be allocated to the STA than are currently allocated. For example, in some scenarios, the More Allocation Field may be set to a first value (e.g., 1) to indicate that the STA requests the AP to allocate more RUs to the STA. The More Allocation field may be set to a second value (e.g., 0) to indicate that the STA does not request more RU allocations from the AP, e.g., because no information is available at the client device or because the current scheduling satisfies the STA's traffic requirement. In other scenarios, the More Allocation field may include a plurality of bits, and may indicate additional information, such as a desired amount by which the RUs may be increased. Alternatively, the SSR may include one or more additional fields, such as a Step Size field associated with the More Allocation field. Such a Step Size field may indicate a requested/suggested amount by which the AP should increase the RU allocation in response to a request in the More Frequent Scheduling field.

The DL BA Request field may indicate a request for the AP to set up a downlink Block ACK (BA) agreement with the STA. For example, this field may be used when the STA has torn down the downlink block ACK agreement, but the AP has not yet initiated setting up a new downlink block ACK agreement. For example, the DL BA Request field may be set to a first value (e.g., 1) to indicate that the STA is requesting the AP to set up Block ACK agreement for the traffic identifiers (TIDs) that have not set up BA agreement. The DL BA Request field may be set to a second value (e.g., 0) to indicate that no DL BA request is being made.

The Slow LA Request field may be used by the STA to influence link adaptation (LA) performed by the AP. For example, in some scenarios, if the AP does not receive an ACK or BA in response to a transmitted packet, the AP may respond by performing link adaptation, such as reducing the link rate or changing the modulation and coding scheme (MCS), based on the assumption that the transmitted packet and/or the ACK/BA was lost due to collision or poor link margin. However, in some scenarios, the STA may fail to transmit an ACK or BA due to transmit limitations of the STA. In such scenarios, the STA may use the Slow LA Request field to inform the AP that the lack of ACK or BA from the STA may be due to the STA's Tx limitations. In response to an indication in the Slow LA Request field, the AP may reduce or forego such rate reduction and/or other link adaptation that would otherwise be performed responsive to a missing ACK/BA. For example, the Slow LA Request may be set to a first value (e.g., 1) to indicate that the STA is requesting the AP to reduce its rate scaling due to lack of ACK or BA from the STA. In other scenarios, the Slow LA Request field may include a plurality of bits, and may indicate additional information, such as a desired amount by which the link adaptation may be slowed. Alternatively, the SSR may include one or more additional fields, such as a Step Size field associated with the Slow LA Request field. Such a Step Size field may indicate a requested/suggested amount by which the AP should decrease link adaptation in response to a request in the Slow LA Request field.

In some scenarios, additional or alternative fields may be used by the STA to provide feedback regarding current scheduling parameters. For example, the SSR may include a Max Tx Power for TB PPDU field, which may indicate a maximum transmission power the STA can use when transmitting according to the allocated resources.

Any of the fields included in the SSR, e.g., as illustrated in Table 1, or in any other implementation, may be determined by the STA, e.g., based on one or more of: a current transmit queue size at the STA, future traffic known or inferred by the STA, QoS requirements of the STA or of an application being implemented by the STA, current channel conditions, or other factors known to the STA.

In some scenarios, the SSR may include a buffer status of the STA, e.g., as in a BSR. In other scenarios, the SSR may not include the buffer status of the STA, e.g., because the buffer status may be reported to the AP in a BSR, or because the buffer status may be unnecessary in light of the other data communicated in the SSR.

Another example of one possible configuration of an SSR is shown in Table 2. The example shown in Table 2 may be included in any of various communications. For example, the SSR shown may be included in an information element (IE) included in a management frame (e.g., a management frame as defined in an applicable 802.11 standard). It should be understood that the SSR defined in Table 2 is a specific example, and many other formats are also possible.

TABLE 2

| Field Name | Field Size | Description |
| --- | --- | --- |
| Version | 1 Octet | Version of the SSR format |
| SSR Subtype | 1 octet | 0x00: regular SSR with parameters<br>0x01: additional SSR subtype<br>Others: reserved |
| Length | 1 octet | The length of the SSR Subtype Content field, excluding the Length field |
| SSR Subtype Content | SSR Subtype dependent | SSR Subtype Content |

As an example, an IE including an SSR (e.g., the SSR shown in Table 2) may be formatted as shown in Table 3.

TABLE 3

| Field Name | Field Size (Octets) | Description |
| --- | --- | --- |
| Element ID | 1 | Element ID |
| Length | 1 | Length of the IE |
| OUI | 3 | Company OUI |
| Type | 1 | SSR IE type |
| Type-Specific Content | Content-specific | SSR IE Content |

The example shown in Table 3 represents a vendor-specific IE, which may include an SSR. For example, the SSR shown in Table 2 may be included within the Type-Specific Content field of the IE shown in Table 3. In other examples, an IE may be a general IE, rather than a vendor-specific IE, in which case the organizationally unique identifier (OUI) field may be omitted. It should be understood that the IE defined in Table 3 is a specific example, and many other formats are also possible.

An SSR may include one or more parameters to be communicated from the STA to the AP. As an example, possible formats and values of such parameters are shown in Table 4. In some scenarios, one or more of the parameters shown in Table 4 may be included in the SSR Subtype Content field of the SSR shown in Table 2, e.g., for SSR Subtype 0x00. It should be understood that the parameters and formats defined in Table 5 illustrate a specific example, and many other options are also possible.

TABLE 4

| Field Name | Field Size | Description |
| --- | --- | --- |
| Min Trig | 2 octets | Minimum Trigger interval requested, in units of 5 ms. |

TABLE 4-continued

| Field Name | Field Size | Description |
| --- | --- | --- |
| Interval | | When set to 0xFFFF, no information is provided. When set to 0x0000, no request is made on Min Trig Interval, and earlier requests on Min Trig Interval are obsolete. |
| Max Trig Interval | 2 octets | Maximum Trigger interval requested, in units of 5 ms. When set to 0xFFFF, no information is provided. When set to 0x0000, no request is made on Max Trig Interval, and earlier requests on Max Trig Interval are obsolete. |
| Min Allocation Rate | 2 octets | Minimum allocation needed, in units of 64 Kbps. When set to 0xFFFF, no information is provided. When set to 0x0000, no request is made on Min Allocation Rate, and earlier requests on Min Allocation Rate are obsolete. This field may be defined for each traffic identifier (TID), for each access category, and/or for the overall traffic requirement. |
| Current Scheduling Feedback: | 2 octets | |
| More Frequent Scheduling | b0 | When set to 1, more frequent allocation is requested. When set to 0, no request is made on frequency of the allocations. |
| More Allocations | b1 | When set to 1, allocation of more RUs is requested. When set to 0, no request is made on frequency of the allocations. |
| Step size for "More Frequent Scheduling" field | b2-3 | Step size, in units of 2 ms, for the AP to reduce the trigger frame interval when the "More Frequent Scheduling Needed" field is set to 1. Value 0 indicates that this information is not provided by the STA, and it is up to the AP to decide the reduction in trigger frame interval. |
| Step size for "More Allocation" field | b4-5 | Step size, in units of 64 Kbps, for the AP to increase the RU allocations in trigger frames when the "More Frequent Scheduling Needed" field is set to 1. Value 0 indicates that this information is not provided by the STA, and it is up to the AP to decide the increase in RU allocations in trigger frames. |
| Max Tx Power for TB PPDU | b6-7 | Indicates the max transmission power the STA can use to transmit TB PPDU in response to trigger frames. Value 0 indicates that this information is not provided by the STA. |
| Reserved | Remaining bits | Reserved |

As another example, possible formats and values of parameters to be communicated from by the STA to the AP are shown in Table 5. In some scenarios, one or more of the parameters shown in Table 5 may be included in the SSR Subtype Content field of the SSR shown in Table 2, e.g., for SSR Subtype 0x01. It should be understood that the parameters and formats defined in Table 5 illustrate a specific example, and many other options are also possible.

TABLE 5

| Field Name | Field Size | Description |
| --- | --- | --- |
| DL BA Setup Request | 1 octet | The STA is requesting the AP to set up downlink Block ACK agreement for the TID that is set to 1 in the octet. |
| STA Performance Feedback: | 1 octet | |
| Slow LA Request | b0 | The STA is requesting the AP to slow the rate of MCS adaptation implemented when reducing rate due to lack of acknowledgment from the STA. |
| Reserved | Remaining bits | Reserved |

In some implementations, the AP may be configured (e.g., obligated, required) to take certain action(s) in response to receiving an SSR. For example, the AP may be configured to comply with the Minimum Trigger interval, Maximum Trigger interval, Minimum Allocation Rate, and/or other parameters communicated in the SSR. As another example, the AP may be configured to make a best effort attempt to comply with such parameters. As yet another example, the AP may be configured to consider the requested parameters, e.g., in conjunction with data from other sources.

As a specific example, an AP may interpret SSR parameters as follows, e.g., when the SSR Subtype is 0x00.

After receiving SSR information with a non-zero, non-0xFFFF Min Trig Interval, the AP may adjust the minimum interval between trigger frames addressed to this particular STA to be Min Trig Interval.

After receiving SSR information with a non-zero, non-0xFFFF Max Trig Interval, the AP may adjust the maximum interval between trigger frames addressed to this particular STA to be Max Trig Interval.

After receiving SSR information with a non-zero, non-0xFFFF Min Allocation Rate, the AP may schedule the UL OFDMA transmission opportunity for this STA in such a way that the total MAC throughput through trigger-based access is at least min Allocation rate (Mbps).

When any of the Min Trig Interval, Max Trig Interval, or Min Allocation Rate fields is set to 0, the AP may ignore the corresponding requesting parameters in the SSR.

When any of the Min Trig Interval, Max Trig Interval, or Min Allocation Rate fields is set to 0xFFFF, the AP may consider that earlier SSR requests for the corresponding parameters become obsolete. E.g., the AP may operate as if there is no longer any request on the corresponding parameters from the STA.

After receiving SSR information with no valid min and max Trig Interval, but wherein "More frequent Scheduling" is set to 1, then the AP may reduce its trigger frame interval by a predetermined amount. The predetermined amount may be based on the "Step Size for More Frequent Scheduling Needed" field. The AP may not be configured (or required) to adjust its trigger frame interval (or may be configured to not adjust its trigger frame interval) if this field is set to 0.

After receiving SSR information wherein "More Allocation" is set to 1, then the AP may increase its allocation to this STA by a predetermined amount. The predetermined amount may be based on the "Step Size for More Allocation" field. The AP may not be configured (or required) to adjust its trigger frame allocations (or may be configured to not adjust its trigger frame allocations) to this STA if this field is set to 0.

After receiving the Max Tx Power for TB PPDU information, the AP may adjust its trigger frame parameters to ensure the STA does not exceed the value indicated by the Max TX Power for TB PPDU field when transmitting a trigger-based PLCP Protocol Data Unit (TB PPDU) in response to trigger frames.

As another specific example, an AP may interpret SSR parameters as follows, e.g., when the SSR Subtype is 0x01.

When any bit in the DL BA Setup Request field is set to 1, the AP may initiate setting up downlink Block ACK Agreement with the STA for the TID corresponding to that bit. For example, the least-significant bit may correspond to TID 0 and the most-significant bit may correspond to TID 7.

When Slow LA Request is set to 1, the STA is indicating to the AP that the lack of ACK or Block ACK is likely not due to collision, but may instead be due to STA's internal Tx limitations, or other cause. Therefore, the AP may slow its rate scaling down in such case.

In some implementations, frames that carry SSR information may use single user enhanced distributed channel access (SU EDCA) parameters. For example, they may be put into non-trigger-based access queues to avoid any potential delay due to AP's scheduling policy.

In some implementations, a QoS Null frame carrying BSR information may be sent in either SU EDCA parameters or Trigger-based access, e.g., whichever acquires the medium first.

It should be understood that the preceding explanations and illustrations are merely examples, and additional variations are possible. In various implementations, some of the elements illustrated may be omitted or changed.

Figure 5:
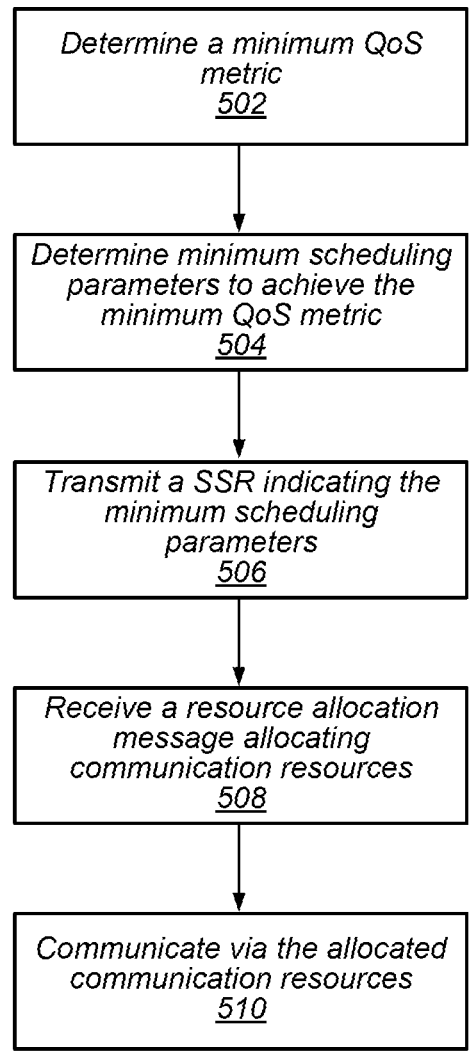
FIG. 5 is a flow diagram illustrating an example method for performing resource scheduling, according to some embodiments.

FIG. 5—Method for Resource Scheduling

FIG. 5 is a flow diagram illustrating an example method for performing resource scheduling, according to some embodiments, consistent with the preceding discussion. The method of FIG. 5 may be performed by a STA, such as the UE 106, or by some portion thereof, such as by the wireless communication circuitry 230 and/or the processor(s) 202. It should be understood that the flow diagram shown in FIG. 5 is one example, and numerous variations are envisioned within the scope of the present disclosure. For example, one or more of the elements illustrated in FIG. 5 may be omitted or rearranged, or additional elements may be added.

At 502, the STA may determine a minimum quality of service metric for wireless communication between the STA and an AP, such as the AP 104. For example, the minimum quality of service metric may be a minimum desired metric, e.g., for supporting a software application being implemented by the STA, or a minimum acceptable quality of service metric needed, e.g., to accommodate expected traffic parameters for the application. The minimum quality of service metric may include one or more measure of QoS, including any metrics known in the art.

At 504, the STA may determine minimum scheduling parameters to achieve the minimum QoS metric. For example, the minimum scheduling parameters may include a minimum and/or maximum interval between trigger frames transmitted by the AP, wherein the trigger frames carry resource allocation information for the STA. As another example, the minimum scheduling parameters may include a minimum data throughput to be accommodated by the allocated communication resources. Other minimum scheduling parameters are also envisioned.

At 506, the STA may transmit, to the AP, a SSR indicating one or more of the minimum scheduling parameters. In some scenarios, the SSR may be transmitted periodically. In some scenarios, the SSR may be transmitted in response to initiation of the software application by the STA. In some scenarios, the SSR may be included in an A-Control field of a MAC header of a communication packet. In some such scenarios, the MAC header may further include an indication that the A-Control field includes the specific scheduling request. In some scenarios, the SSR may be included in an IE of a management frame.

In some scenarios, the SSR may also indicate feedback regarding current allocation of communication resources to the STA. For example, the feedback regarding current allocation of communication resources to the STA may include a request that the AP transmit trigger frames more frequently than currently scheduled. As another example, the feedback may include a request that the AP allocate more resource units to the STA than are currently allocated. As yet another example, the feedback may include a request that the AP set up a block-acknowledge agreement with the STA. Other feedback regarding current allocation of communication resources to the STA is also envisioned.

In some scenarios, the SSR may also include additional requests regarding performance or behavior of the AP in connection with the STA. For example, the SSR may include a request that the AP reduce the rate at which it performs link adaptation in response to failure to receive an acknowledgment message from the STA.

In some scenarios, the SSR may also include a buffer status of the STA, e.g., similar or identical to the information provided in a BSR.

At 508, the STA may receive, from the AP, a resource allocation message, allocating communication resources to the STA based at least in part on the SSR. For example, the resource allocation message may allocate resources as specified by the minimum scheduling parameters, feedback regarding current allocation of communication resources to the STA, and/or other information included in the SSR, such as by allocating resources that comply with a requested minimum data throughput, trigger interval, etc. As another example, the resource allocation message may not allocate resources that fully comply with the scheduling parameters and/or other information included in the SSR, but may allocate resources in a manner that was influenced by such information, or may allocate resources that comply with a portion of such information. In some scenarios, the allocated resources may include RUs, e.g., scheduled at indicated times and having indicated size(s).

In some scenarios, the AP may also take other action in response to receiving the SSR that is transmitted by the STA at 506. For example, responsive to the SSR, the AP may change the interval between transmitting trigger frames. As another example, the AP may establish a DL block agreement with the STA.

At 510, the STA may communicate, with the AP, using the allocated communication resources. For example, the STA may transmit using RUs allocated in the resource allocation message.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or any combination of the method embodiments described herein, or any subset of any of the method embodiments described herein, or any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or any combination of the method embodiments described herein, or any subset of any of the method embodiments described herein, or any combination of such subsets). The device may be realized in any of various forms.

Any of the methods described herein for operating a UE or STA may be the basis of a corresponding method for operating an AP or appropriate network node, by interpreting each message/signal X received by the STA in the downlink as message/signal X transmitted by the AP, and each message/signal Y transmitted in the uplink by the STA as a message/signal Y received by the AP.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A client station (STA) comprising:
wireless communication circuitry and
processor circuitry communicatively coupled to the wireless communication circuitry, the processor circuitry configured to cause the STA to:
   determine a minimum quality of service metric for supporting a software application being implemented by the STA;
   determine minimum scheduling parameters to be implemented by an access point (AP) in wireless communication with the STA to achieve the minimum quality of service metric;
   transmit to the AP, via the wireless communication circuitry, a specific scheduling request indicating the minimum scheduling parameters;
   receive from the AP, via the wireless communication circuitry, a resource allocation message, allocating communication resources to the STA based at least in part on the specific scheduling request; and
   communicate with the AP, via the wireless communication circuitry, using the allocated communication resources.

2. The STA of claim 1, wherein the specific scheduling request is included in an A-Control field of a medium-access control (MAC) header of a communication packet.

3. The STA of claim 2, wherein the MAC header further includes an indication that the A-Control field includes the specific scheduling request.

4. The STA of claim 1, wherein the specific scheduling request is included in an information element of a management frame.

5. The STA of claim 1, wherein the specific scheduling request is transmitted in response to initiation of the software application by the STA.

6. The STA of claim 1, wherein the minimum scheduling parameters include at least one of a minimum interval between trigger frames transmitted by the AP or a maximum interval between trigger frames transmitted by the AP, wherein the trigger frames carry resource allocation information for the STA.

7. The STA of claim 1, wherein the minimum scheduling parameters include a minimum data throughput to be accommodated by the allocated communication resources.

8. The STA of claim 1, wherein the specific scheduling request further indicates feedback regarding current allocation of communication resources to the STA.

9. The STA of claim 8, wherein the feedback regarding current allocation of communication resources to the STA includes at least one of a request that the AP transmit trigger frames more frequently than currently scheduled, or a request that the AP set up a block-acknowledge agreement with the STA.

10. A method of performing communication resource scheduling, the method comprising:
by a client station (STA):
   determining a minimum desired quality of service metric for wireless communication between the STA and an access point (AP);
   determining minimum scheduling parameters to be implemented by the AP to achieve the minimum desired quality of service metric;
   transmitting, to the AP, a specific scheduling request indicating the minimum scheduling parameters;
   receiving, from the AP, a resource allocation message, allocating communication resources to the STA based at least in part on the specific scheduling request; and
   communicating with the AP via the allocated communication resources.

11. The method of claim 10, wherein the specific scheduling request further indicates feedback regarding current allocation of communication resources to the STA.

12. The method of claim 10, wherein the specific scheduling request is included in an A-Control field of a MAC header of a communication packet.

13. The method of claim 12, wherein the MAC header further includes an indication that the A-Control field includes the specific scheduling request.

14. The method of claim 10, wherein the specific scheduling request is included in an information element of a management frame.

15. The method of claim 10, wherein the minimum desired quality of service metric is a minimum acceptable quality of service metric needed to accommodate expected traffic parameters for an application being supported by the STA, wherein the specific scheduling request is transmitted in response to initiation of the application.

16. A non-transitory computer-readable memory medium storing software instructions executable by a processor of a client station (STA), wherein when executed the software instructions cause the STA to:
   determine a minimum quality of service metric for supporting a software application being implemented by the STA;
   determine minimum scheduling parameters to be implemented by an access point (AP) in wireless communication with the STA to achieve the minimum quality of service metric;
   transmit, to the AP, a specific scheduling request indicating the minimum scheduling parameters;
   receive, from the AP, a resource allocation message, allocating communication resources to the STA based at least in part on the specific scheduling request; and communicate with the AP, using the allocated communication resources.

17. The non-transitory computer-readable memory medium of claim 16, wherein the minimum scheduling parameters include at least one of a minimum interval between trigger frames transmitted by the AP or a maximum interval between trigger frames transmitted by the AP, wherein the trigger frames carry resource allocation information for the STA.

18. The non-transitory computer-readable memory medium of claim 16, wherein the minimum scheduling parameters include a minimum data throughput to be accommodated by the allocated communication resources.

19. The non-transitory computer-readable memory medium of claim 16, wherein the specific scheduling request further includes at least one of a request that the AP transmit trigger frames more frequently than currently scheduled, or a request that the AP set up a block-acknowledge agreement with the STA.

20. The non-transitory computer-readable memory medium of claim 16, wherein the specific scheduling request further includes a request that the AP reduce a rate at which it performs link adaptation in response to failure to receive an acknowledgment message from the STA.

* * * * *